United States Patent
Helmens et al.

(10) Patent No.: US 11,622,565 B2
(45) Date of Patent: Apr. 11, 2023

(54) CHEESECAKE FILLING

(71) Applicant: Coöperatie AVEBE U.A., Veendam (NL)

(72) Inventors: Harm Jaap Helmens, Slochteren (NL); Jerôme Vlaanderen, Groningen (NL)

(73) Assignee: Coöperatie AVEBE U.A., Veendam (NL)

( * ) Notice: Subject to any disclaimer, the term of this patent is extended or adjusted under 35 U.S.C. 154(b) by 331 days.

(21) Appl. No.: 16/094,344

(22) PCT Filed: Apr. 18, 2017

(86) PCT No.: PCT/NL2017/050243
§ 371 (c)(1),
(2) Date: Oct. 17, 2018

(87) PCT Pub. No.: WO2017/183968
PCT Pub. Date: Oct. 26, 2017

(65) Prior Publication Data
US 2019/0261640 A1    Aug. 29, 2019

(30) Foreign Application Priority Data

Apr. 18, 2016 (EP) .................................. 16165838

(51) Int. Cl.
| A23C 19/076 | (2006.01) |
| A23C 19/05 | (2006.01) |
| A23C 19/09 | (2006.01) |
| A23C 19/028 | (2006.01) |

(52) U.S. Cl.
CPC ........ A23C 19/0765 (2013.01); A23C 19/028 (2013.01); A23C 19/054 (2013.01); A23C 19/076 (2013.01); A23C 19/09 (2013.01); A23C 19/0912 (2013.01); C12Y 204/01025 (2013.01); *A23V 2002/00* (2013.01)

(58) Field of Classification Search
CPC . A23C 19/0765; A23C 19/028; A23C 19/076; A23C 19/0912; C12Y 204/01025; C08B 31/003
See application file for complete search history.

(56) References Cited

U.S. PATENT DOCUMENTS

| 4,369,196 | A | 1/1983 | Sukegawa | |
| 5,807,601 | A | 9/1998 | Carpenter et al. | |
| 5,882,704 | A * | 3/1999 | Yamaguchi | A23C 19/055 |
| | | | | 426/34 |
| 6,406,736 | B1 * | 6/2002 | Han | A23C 19/028 |
| | | | | 426/519 |
| 2004/0022896 | A1 * | 2/2004 | Cha | A23C 19/028 |
| | | | | 426/36 |
| 2006/0188631 | A1 * | 8/2006 | Woo | A23C 19/0912 |
| | | | | 426/549 |
| 2010/0143542 | A1 * | 6/2010 | Buwalda | A23L 29/212 |
| | | | | 426/64 |

FOREIGN PATENT DOCUMENTS

| CA | 1107130 A | 8/1981 |
| CN | 1832687 A | 9/2006 |
| CN | 104754949 A | 7/2015 |
| EP | 0932444 | 8/1999 |
| JP | 5724383 B2 | 4/2015 |
| JP | 2015188387 A | 11/2015 |
| SG | 172379 A1 | 7/2011 |
| WO | 9815347 A1 | 4/1998 |
| WO | 2008071744 A2 | 6/2008 |

OTHER PUBLICATIONS

XP-002760748, WPI/Thomson Scientific, London, GB, JP 5724383.
XP-002760749, WPI/Thomson Scientific, London, GB, JP 2015188387.

* cited by examiner

*Primary Examiner* — Jeffrey P Mornhinweg
(74) *Attorney, Agent, or Firm* — Hoffmann & Baron, LLP

(57) ABSTRACT

The invention pertains to whey-bound fresh cheese such as cream cheese, and the stabilization thereof using granular starch and an amylomaltase-treated starch and/or an emulsifier, and to methods of making such fresh cheeses. Whey-bound fresh cheeses with these additional ingredients display increased stability, which makes them suitable for application in heated food products. In addition, the invention is directed to food products comprising such whey-bound fresh cheeses, as well to methods of making these food products, and to use of a granular starch and amylomaltase-treated starch for the stabilization of a whey-bound fresh cheese.

8 Claims, 3 Drawing Sheets

CHEESECAKE FILLING

This application is the U.S. National Phase of, and Applicant claims priority from, International Patent Application Number PCT/NL2017/050243 filed Apr. 18, 2017, which claims priority from EP 16165838.0 filed Apr. 18, 2016, each of which is incorporated herein by reference.

The invention relates to a whey-bound fresh cheese, and a method of making a whey-bound fresh cheese. The invention also relates to the preparation of fillings for bakery products based on whey-bound fresh cheese, such as cheesecake fillings, as well as to the fillings for bakery products and bakery products comprising such fillings.

All cheese is an emulsion comprising fat, protein and water. Conventional cheese comprises milk fat and milk protein, for instance cow's milk, goat's milk or sheep milk, but cheeses in which these elements are replaced partially or fully with other proteins or fat sources are known.

Cheeses can be classified on the basis of a number of criteria. For instance, on the basis of texture or firmness one can distinguish hard cheeses, such as cheddar and Grana Parmigiano cheeses, semi-hard cheeses, such as Gouda or Edam cheeses, and soft cheeses, such as feta, mozzarella or Brie cheeses. Another distinction that can be made is between cheeses prepared by acidic coagulation alone and cheeses that have been curdled using rennet. It is also possible to distinguish cheeses based on the way they are ripened. Cheeses may have a washed rind, such as Munster or Brick cheeses, a white rind, such as Camembert or Brie cheeses, a naturally ripened rind, such as Gouda cheese, or no rind at all, such as fresh cheese, including cream cheese, cottage cheese or soft curd cheese.

Fresh cheeses are typically prepared by acidic coagulation and/or by using a starter bacteria culture, e.g. *Lactococcus, Lactobacillus*, or *Streptococcus* bacteria. After coagulation, whey is typically separated from the curd, and the curd collected and ripened to result in fresh cheese. Typically, fresh cheese production does not involve the use of rennet, or in any case a lower proportion of rennet to acid than harder cheeses. The curdling step in the production is achieved by using acids, such as for instance citric acid. Fresh cheeses have a soft, spreadable texture and a mildly acidic flavor.

Fresh cheeses are frequently used in cooking and baking. In some recipes, it is important that the fresh cheese retains its shape and texture upon heating or baking. For instance, cheesecakes often contain a filling based on cream cheese (a type of fresh cheese), sugar and eggs, as well as flour and other ingredients, which is baked before cooling and packaging of the cake.

Recently, fresh cheese in which whey is not separated from the curd has been found to provide production advantages over traditional fresh cheese. These advantages include for example a strongly reduced waste stream, as the separated acid whey needs no longer be disposed of. Such whey-bound (sometimes also called "wheyless") fresh cheese thus includes both whey and curd. Because the whey fraction has not been separated, the properties of whey-bound fresh cheese are different from the properties of traditional fresh cheese, in which the whey has been separated from the cheese product.

Whey-bound fresh cheeses have as a drawback that they have only limited heat stability.

Where a traditional fresh cheese can usually be applied in heated food applications, application of a regular whey-bound fresh cheese results in severe syneresis, and ultimately collapse of the fresh cheese. During the heating process the temperature of the fresh-cheese ingredient easily reaches 100° C., which apparently affects the fresh cheese stability.

Many additives and/or ingredients have been proposed to improve the heat stability of fresh cheese. Examples of such additives and/or ingredients include inulin, pectin, gelatin, various types of gums, such a locust bean gum or xanthan gum (see e.g. EP 1 579 769), or maltodextrins in combination with additional whey protein and optionally starches (see US 2008/0160133). To date, however, no sufficiently effective solution has been provided that allows the manufacture of a whey-bound fresh cheese which is sufficiently stable during heating or baking.

SUMMARY OF THE INVENTION

The invention is a cheesecake filling that includes a whey-bound fresh cheese having 1-6 wt. % milk protein based on the weight of the cheese, a granular starch as a first starch type and an amylomaltase [EC 2.4.1.25] treated starch as a second starch type. The quantity of granular starch is 1.5 to 6 wt. %, based on the weight of the cheese. The granular starch can be a stabilized or a crosslinked starch and, more preferably, an adipic acid, phosphorus oxychloride, metaphosphate, citric acid, dimethylol ethylene urea or cyanuric chloride crosslinked starch. The granular starch can also be a waxy starch comprising at least 90 wt. % amylopectin, based on the weight of the starch. The granular starch can be a potato starch, maize starch, rice starch, tapioca starch, pea starch, sweet potato starch, sago starch or wheat starch. The whey-bound fresh cheese can also include an emulsifier.

The invention is also a method for preparing the cheesecake filling that includes the steps of: mixing a fat source and a whey source into a dairy mixture having a desired initial fat concentration; homogenizing the dairy mixture; adding a lactic acid bacterial inoculum and/or a suitable acid; incubating to allow coagulation to occur to form a whey-bound fresh cheese; ripening of the whey-bound fresh cheese; mixing in a granular starch; and mixing in an amylomaltase-treated starch.

DETAILED DESCRIPTION

Figure 1:
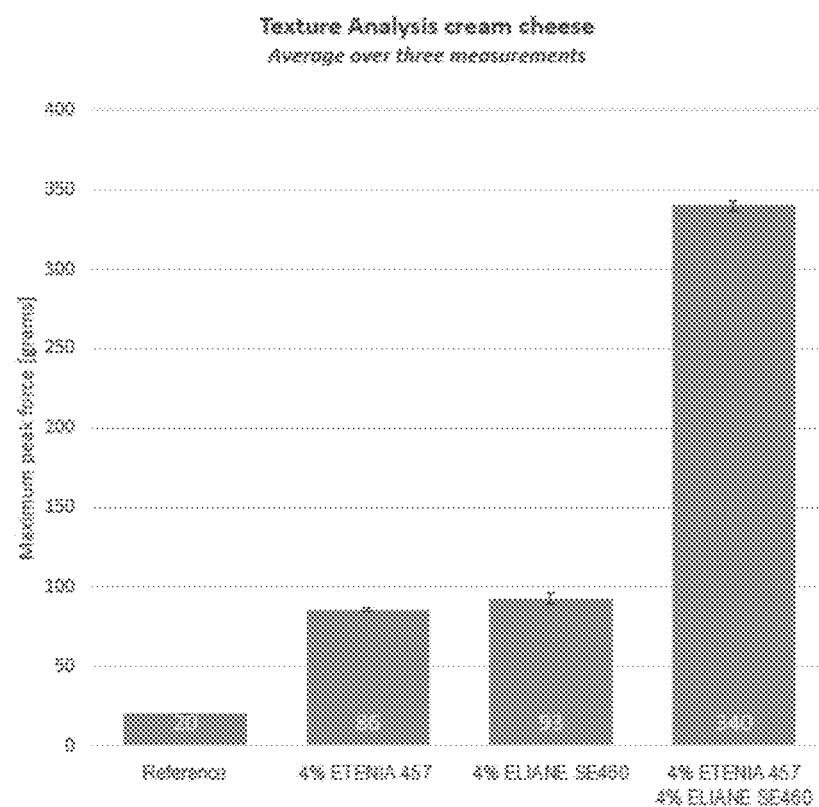
FIG. 1: texture analysis results for cream cheese 1, cream cheese 2 and cream cheese 3, as compared to reference.

The invention discloses a whey-bound fresh cheese, having 1-6 wt. % milk protein based on the weight of the cheese, comprising as a first starch type a granular starch and as a second starch an amylomaltase [EC 2.4.1.25] treated starch. A fresh cheese is defined as cheese which does not have a rind, and which is not or only briefly ripened. Fresh cheeses include for instance mascarpone, ricotta, chevre, feta, cream cheese, quark and cottage cheese. Preferred fresh cheese in the present context is cream cheese and cottage cheese, most preferably cream cheese. Cream cheese is a mild, acid coagulated uncured cheese. It can have the form of a spread, or have a more solid, butter-like form.

Spread-like cream cheese is a cream cheese of relatively low viscosity, which easily changes shape under pressure, such as to form a coherent layer. Butter-like cream cheese has higher viscosity than spread-like cream cheese, and is more easily divided in chunks rather than in a coherent layer.

Cream cheese generally has a fat content of between 6 and 36 wt. %. Generally, butter-like cream cheese has a higher fat content than spread-like cream cheese, such as up to 36 wt. % fat in butter-like cream cheese. Spread-like cream cheese generally has a fat percentage of up to 24 wt. %. These types of cream cheeses are well-known in the art, and either one is a particular target for application of the present invention.

A whey-bound fresh cheese is herein defined as a fresh cheese in which the whey-fraction is not separated off, as in regular fresh cheeses, but instead included (at least partially, but preferably fully) in the fresh cheese product. A whey-bound fresh cheese can be distinguished from a regular fresh cheese by its lower protein content. A whey-bound fresh cheese, in the present context, has a milk protein content of 1-6 wt. %, based on the weight of the cheese, preferably 1.5-5 wt. %, more preferably 2-4.5 wt. %. Regular fresh cheese has a higher milk protein content, of e.g. 6-15 wt. %. It is an advantage of the present invention that whey-bound fresh cheeses may have a lower protein content (and hence a higher whey content) than conventional fresh cheeses, and also lower than other whey-enriched fresh cheese types.

Surprisingly, it has now been found that the heat stability of whey-bound fresh cheese may be significantly improved by the presence of a starch in granular form. In addition, the firmness of the obtained fresh cheese also increases. Accordingly, the invention is directed to a whey-bound fresh cheese, having 1-6 wt. % milk protein based on the weight of the cheese, comprising, as a first starch, a granular starch.

The (net, total) protein content in a whey-bound fresh cheese can be determined by the Kjeldahl-method, by calculation of the Kjeldahl nitrogen content times 6.36, corrected for the presence of non-protein nitrogen components, which amount to about 5% of the total nitrogen in dairy products, as is known in the art. This method determines the total amount of protein, not only milk protein, so that in cases where no additional protein has been added to the whey-bound fresh cheese, it accurately determines the quantity of milk protein in a whey-bound fresh cheese. In cases where additional non-milk-derived protein has been added to the whey-bound fresh cheese, a whey-bound fresh cheese is defined as comprising 1-6 wt. % milk protein as defined above, to be determined on a fresh cheese of equal recipe, but in the absence of the added protein. The net total protein content can furthermore accurately be determined using for example the Sprint™ rapid protein analyzer.

A whey-bound fresh cheese according to the invention has an increased stability, such as an improved resistance against syneresis, an improved firmness, an improved freeze/thaw stability, an improved heat stability and/or improved bake stability, preferably at least an improved heat- or bake stability. Heat stability is the ability to withstand heating in general by the fresh cheese, whereas bake stability is the ability to withstand heat when the fresh cheese is present as one ingredient among other components, such as at a quantity of at least 10 wt. %.

The invention also relates to the use of a granular starch and an amylomaltase-treated starch to improve the stability of a whey-bound fresh cheese, in particular for improving one or more of freeze/thaw stability, heat stability and bake stability of a fresh cheese. Preferably, the improved stability comprises an improved heat- or bake stability.

Starch is a natural carbohydrate based on glucose units joined by glycosidic bonds. It functions as energy storage in most green plants. Depending on the plant, starch contains a different ratio of amylose and amylopectin polymers. Typically, starches contain 15-30 wt. % of amylose and 70-85 wt. % amylopectin, wherein the weight percentages are based on the weight of the starch. However, waxy types of starches may contain much higher proportions of amylopectin, or even only amylopectin. Similarly, there are also high-amylose types of starches in which the proportion of amylose may be as high as 40 wt. % and very high amylose starches may contain up to 75 wt. % of amylose, wherein the weight percentages are based on the weight of the starch.

In the plant, starch molecules are arranged in semi-crystalline granules. Each plant species has a unique starch granular size. Rice has relatively small granules of about 2 µm, whereas potato starch has a much larger granule size of about 100 µm.

In their granular form, starches do not dissolve in water, but form a suspension. When heated, the starch granules swell and burst. The semi-crystalline structure is lost and the viscosity increases. This process is called starch gelatinization. During cooking, the starch becomes a paste and increases further in viscosity. During cooling or prolonged storage of the paste, the semi-crystalline structure partially recovers and the starch paste thickens. This process is referred to as retrogradation.

As mentioned, in accordance with the invention it is important that the starch is present in the whey-bound fresh cheese in granular form. It can be determined whether the starch present in a whey-bound fresh cheese is granular by staining the cheese with an iodine solution, and subsequent visual inspection of the cheese by light microscopy. If a granular starch is present, the starch granules and potential fragments thereof will stain blue/purple or red/brown, depending on the type of starch, which can readily be recognized by the skilled person. Although it is possible that after application of harsh process conditions, a portion of the starch granules fragments, these granule fragments also have a stabilizing effect on the whey-bound fresh cheese in line with the effect of non-fragmented granular starch. As even in cases where starch granules have been fragmented to a certain degree, at least a portion of non-fragmented granular starch will remain, granular starch in the present context is defined as also including granular starch fragments. Shape and size of the (whole) starch granules can be used to identify the origin of the starch, as is known in the art.

Accordingly, in one embodiment the starch is not modified in any way, be it chemically, physically or enzymatically. Such unmodified starches are referred to as native starches. However, it is preferred to use a modified starch, as long as the modification has not destroyed the granular structure of the starch. Examples of possible modifications are annealing, crosslinking, acetylating, hydroxypropylating, bleaching (e.g. as described in WO 2014/053833), heating alkalized starch under very dry conditions and at high temperatures (e.g. as described in U.S. Pat. No. 6,221, 420) or at elevated temperatures in alcohol (e.g. as described in US 2013/309386). Combinations of these modifications can also be employed.

In a preferred embodiment, crosslinked granular starch is used, in particular in cases when the whey-bound fresh cheese is subjected to harsh process conditions. Harsh process conditions in the present context refers to process conditions involving for example high shear or high pressure, as is well-known in the art. Such conditions may occur during homogenization of the fresh cheese, or during subsequent processes in which the finalized cheese is used, such as pasteurization. Harsh process conditions may for example refer to process conditions in which the locally experienced pressure is more than 20 bar, or more than 50 bar, or even more than 100 bar, such as around 160 bar or even higher, for example during homogenization. Alternatively or additionally, harsh process conditions may refer to the application of increased temperatures, such as a temperature of above 50° C., preferably above 65° C., more preferably above 75° C. Such conditions may be maintained for at least 30 seconds, such as at least 1 minute, or even 5 minutes or more, in a particularly harsh process.

A crosslinked starch can be preferably an adipic acid, phosphorus oxychloride, metaphosphate, citric acid, dimethylol ethylene urea or cyanuric chloride crosslinked starch. Preferred crosslinked starches are adipic-acid crosslinked starch, metaphosphate-crosslinked starch, or phosphorus oxychloride-crosslinked starch.

The degree of crosslinking that is required depends on the shear or pressure, and should be such that the granular structure of the starch is retained under the harsh, high-shear conditions. The skilled person knows how to obtain starch of a certain degree of crosslinking.

Crosslinking may for instance be performed with adipic anhydride at 0.003-0.024 wt. %, with sodium trimetaphosphate at 0.01-0.25 wt. %, or with phosphorous oxychloride at 0.0001-0.01 wt. %, under well-known conditions.

In another preferred embodiment, the granular starch can be a stabilized starch, preferably an acetylated or hydroxypropylated starch, preferably at a degree of substitution ("DS") of up to 0.091 mole acetate per mole of anhydroglucose for acetylated starch, or of up to 0.21 mole hydroxypropyl per mole of anhydroglucose for hydroxypropylated starch. The skilled person knows how to obtain starch of a certain degree of substitution.

In a much preferred embodiment, the granular starch can be both crosslinked, as defined above, and stabilized, as defined above, in particular for fresh cheese which is to be subjected to harsh process conditions.

These modifications are known per se, and may be carried out in any known way as long as the granular structure of the starch is retained. It is to be noted that for many of the mentioned modifications it is possible to achieve them in a process wherein the starch is dissolved or gelatinized and its granular structure is lost. It will be understood that, if the modification has been carried out in this way, it will not result in a granular starch that can be used in the context of the invention.

In accordance with the invention, it is possible to use a granular starch from any botanical source. Examples include potato starch, maize starch, rice starch, tapioca starch, pea starch, sweet potato starch, sago starch and wheat starch. Root or tuber starch is preferred, most preferably potato starch. It has been found feasible to use starches with either a high amylopectin content, such as waxy starches, or starches with a high amylose content, as well as starch with a regular ratio of amylose to amylopectin. Preferably, the granular starch is a waxy starch, i.e. a starch having an amylopectin content of above 90 wt. %, preferably above 95 wt. %, more preferably above 98 wt. %.

A whey-bound fresh cheese according to the invention will generally comprise from about 0.5 to about 10 wt. % of granular starch as defined above, based on the weight of the cheese. Preferably, the amount of granular starch in the whey-bound fresh cheese is from 1 to 7.5 wt. %, based on the weight of the fresh cheese, more preferably from 1.5 to 6 wt. %.

Processes for making a whey-bound fresh cheese are known by the skilled person. In some embodiments, whey-bound fresh cheese is prepared by a fermentation process which is applied to separate the whey and the curd. Fermentation can be achieved by application of for instance suitable lactic acid bacteria, as is known in the art. In this case, a mixture of for instance milk and cream is prepared at the desired fat concentration, whereupon fermentation results in coagulation, which gives the fresh cheese.

In other embodiments, a whey-bound fresh cheese can be prepared without fermentation. In this case, a mixture of for instance milk and crème fraiche (a milk product which has already been fermented) is mixed at the desired fat concentration, which can be coagulated by the addition of a suitable acid, resulting in the fresh cheese.

Generally, a process for preparing a whey-bound fresh cheese according to the invention comprises the steps of mixing a fat source, such as cream or crème fraiche, and a whey source, such as milk, into a dairy mixture having a desired initial fat concentration, homogenizing the resulting mixture, adding a lactic acid bacterial inoculum and/or a suitable acid such as citric acid, and incubating the resulting mixture to allow coagulation to occur, wherein the method comprises a step of mixing in a granular starch and a step of mixing in an amylomaltase-treated starch. Thus, a granular starch and an amylomaltase-treated starch are mixed into the dairy mixture. Optionally, the coagulated mixture is homogenized a second time, and further optionally, the cream cheese product is pasteurized after having been formed.

Granular starch and/or amylomaltase-treated starch may be added to the dairy mixture at any point in the production process, including after obtaining the final fresh cheese product. The granular starch and the amylomaltase-treated starch may be added separately, for instance at different points of the production process, or simultaneously. Thus, granular starch and/or amylomaltase-treated starch may be added to the dairy mixture during or after the mixing of the fat source and the whey source, or they may be added to the fat source or the whey source prior to mixing. Also, the granular starch and/or amylomaltase-treated starch may be added prior to, during or after the homogenization step, or prior to, during or after the incubation step. It is preferred that the granular starch and/or amylomaltase-treated starch is added after the first homogenization step. Further preferably, the granular starch is added prior to the second homogenization step, if any.

The fat source may for instance be anhydrous milk fat, concentrated milk fat (i.e. cream or crème fraiche), butter or another dairy fat. Optionally, an edible vegetable oil may be used as the fat source, or may be used in combination with a dairy fat. Suitable examples of vegetable oils include palm oil, canola oil, coconut oil, soybean oil and the like. Optionally, other milk protein sources such as dry whey powder, whey protein concentrate, milk concentrate, fresh milk and non-fat dry milk can be added along with the fat source. Preferably however, no further milk proteins are added into the mixture, as milk protein is relatively expensive.

The whey source may be whey protein concentrate, whey protein isolate, sweet whey, acid whey, milk, or a combination thereof. Alternatively milk powders, skimmed milk powder, milk protein concentrate, milk protein isolate of combinations thereof can be a whey source. Protein powders are mixed in water to reach the preferred protein concentration of the whey-bound fresh cheese. Preferably, the whey source is milk. The milk may be cow's milk, goat's milk, sheep's milk, or any other type of milk typically used for the preparation of cheese.

The fat source and the whey source are combined in a ratio to achieve a desired initial fat concentration. The initial fat concentration can be between 6 and 36 wt. % for any fresh cheese. In particular, for making cream cheese, the initial fat concentration is 6-24 wt. % for spread-like cream cheese, and 24-36 wt. % for butter-like cream cheese. The fat concentration can be calculated from the fat percentages of the used ingredients, but may also be determined by analysis using a Gerber butyrometer, as is known in the art.

At the stage of mixing the whey source and the fat source, it is also possible to add water. Typically, this will be about 10 to about 50 wt. % based on the weight of the mixture.

The mixture of the fat source and whey source is then homogenized. Preferably, the mixture of the fat source and the whey source, preferably cream and milk, is pasteurized after the step of homogenization. Pasteurization may suitably be carried out by heating to a temperature of 70-75° C. for about 15-30 seconds, but the skilled person has knowledge of many other suitable methods.

The homogenized mixture is preferably cooled to a suitable settling temperature, which is typically between 15 and 35° C., preferably between 20 and 30° C., before its pH is adjusted to achieve the desired coagulation. The coagulation may be achieved by use of an appropriate lactic acid bacterial starter culture, an edible acid, or a combination of the two. Also suitable are other compounds known for this function, among which glucono delta lactone. Suitable lactic acid bacterial starter cultures are typically *Lactococcus*, *Lactobacillus*, or *Streptococcus* bacteria. Examples of suitable edible acids that can be used include citric acid, acetic acid, lactic acid, malic acid, fumaric acid, tartaric acid, hydrochloric acid, sulfuric acid, phosphoric acid and combinations thereof. Preferably, lactic acid is used. In this step, the pH is preferably adjusted to a value of about 5.5 or lower, more preferably about 3.5-5.3, and even more preferably from 4.3-5.0. This initiates the incubation to achieve coagulation.

The duration of the incubation step will depend on the conditions and on the type of fresh cheese that is being prepared. Generally, the incubation step will last from between 6 to 16 hours, preferably between 9 and 13 hours. The temperature during the incubation step is preferably between 15 and 35° C., preferably between 20 and 30° C.

Once the coagulation has occurred to the desired degree, the obtained mixture can be separated into a whey fraction and a curd fraction to obtain a regular (non-whey-bound) fresh cheese. In the present context however, whey is (at least partially, but preferably fully) retained. It is preferred in this stage to include a second homogenization step. After obtaining the fresh cheese, it is preferred if the temperature is kept below room temperature until use, such as a temperature of 1-15° C., preferably 2-10° C. In much preferred alternative embodiments, the fresh cheese is pasteurized during or after the production process, preferably after. Preferably the granular starch and/or amylomaltase-treated starch is added before this last pasteurization step. However the granular starch and/or amylomaltase-treated starch may be added at any moment of the fresh cheese production process.

The stability, in particular the heat or bake stability, of fresh cheese in the present context can be ascertained by evaluation of the properties of cheesecakes comprising a whey-bound fresh cheese, preferably a whey-bound cream cheese. It has been found that addition of a granular starch as described increases the stability of whey-bound fresh cheese such that it becomes possible to prepare a cheesecake using the whey-bound fresh cheese of the invention.

In this context, it is possible to use a whey-bound fresh cheese comprising granular starch as described in the cheesecake filling, but it is also possible to use a conventional whey-bound cream cheese in making a cake filling batter, and mix the granular starch with the cake filling batter. In the latter case, a firmer cheesecake is obtained. In the former case, production efficiency is higher and heat- and bake stability is very similar to that of conventional, non-whey-bound cream cheese, which provides advantages because it allows the use of whey-bound fresh cheese in food applications which require heating, something which was not formerly possible.

Cheesecakes prepared using whey-bound fresh cheese without added granular starch do not result in acceptable cheesecakes, as the cheesecake filling, comprising the whey-bound fresh cheese, becomes too liquid ("runny"), and/or displays heavy water- and fat loss either at the top of the cake, or at the bottom, or both. Loss of water is also called syneresis. The liquefaction of the filling upon baking results in soggy products with a liquid, saucy filling, which are not recognizable or suitable as cheesecake.

Addition of granular starch as described above however results in a cheesecake which has a solid filling which looses not or barely water or fat.

Evaluation of the cheesecake texture by a texture analyzer (Stable Micro Systems, UK) allows to compare the texture of cheesecakes made with filling based on various types of fresh cheese quantitatively. It was found that cheesecake comprising whey-bound fresh cheese as well as granular starch had a much improved texture, relative to cheesecakes having no granular starch.

In addition, sensory evaluation as well as microscopic analysis clearly showed the improvement in cheesecake quality. These improvements, as well as the methods used to ascertain the improvements, have been described in the examples.

In addition, addition of a granular starch to a fresh cheese also has an effect on the texture of the fresh cheese as such. Whey-bound fresh cheese comprising granular starch has a higher viscosity and is more solid than whey-bound fresh cheese not comprising granular starch.

The whey-bound fresh cheese of the invention additionally comprises, as a second starch, an amylomaltase-treated starch. The preparation of amylomaltase starch has been described in European patent application 0 932 444, which is referred to in as far as that document describes the preparation of amylomaltase-treated starch.

In short, an amylose containing starch is converted by a α-1-4, α-1-4 glucano transferase (amylomaltase, EC 2.4.1.25) to a chain elongated amylopectin. The typical and relevant activity of the amylomaltase is that the enzyme breaks an α-1, 4 bond between two glucose units to subsequently make a novel α-1, 4 bond. This amylomaltase does not degrade the starch, but reattaches the amylose onto the amylopectin. In the end the amylose is reattached to the amylopectin resulting in the desired product.

Starches suitable for the preparation of the amylomaltase treated starch are as defined above. As such, potato starch, maize starch, rice starch, tapioca starch, pea starch, sweet potato starch, sago starch and wheat starch are examples of suitable starches. Potato starch is preferred. It has been found feasible to use starches with a high amylose content, as well as starch with a regular ratio of amylose to amylopectin. Preferably, the amylomaltase-treated starch is a regular starch, i.e. having a natural ratio of amylose to amylopectin.

Alternatively, the amylomaltase treated starch can be derived form a blend of amylose-rich starch and amylopectin-rich starch. Amylose-rich starch may be derived from naturally occurring mutants of starch plants, such as high amylose corn, pea or bean starch. It may also be obtained from genetically modified plant varieties such as potatoes modified to preferentially produce amylose.

Amylopectin-rich starch may be for example waxy maize, waxy wheat, waxy rice, amylopectin potato, amylopectin tapioca, amylopectin sweet potato or amylopectin sago starch. Amylopectin starches may be derived from plants that selectively produce amylopectin and/or from genetically modified plant varieties such as potatoes and tapioca modified to selectively produce amylopectin.

By way of example, one suitable way to prepare the amylomaltase treated starch involves preparing a suspension of regular potato starch in water (19-20% w/w). This suspension is jet-cooked at 150-160° C. in order to dissolve the starch. The product is cooled in vacuo to 70° C. Flash cooling is a preferred option. The pH is adjusted to 6.2 using for example 6N sulfuric acid. Then amylomaltase (2 ATU/g starch) is added. The solution is stirred for 2 to 20 hours at 70° C. Then the solution is jet-cooked at 130° C. for a short time, for example 1 to 20 seconds and spray dried using for example a model Compact spray dryer (Anhydro, Denmark). To the artesian it is obvious that changes in the process in temperature, reaction time, starch concentration and enzyme concentration are interlinked and suitable products can be made using these variables. Furthermore the enzyme may be removed by active carbon treatment or ion exchange. Other drying techniques are possible too.

The amylomaltase-treated starch has preferably been treated with amylomaltase at 0.5-5 ATU/g, more preferably 1-4 ATU/g, more preferably 1.5-3 ATU/g.

Preferably, a quantity of 0.5-10 wt. %, preferably 1-6 wt. % of an amylomaltase treated starch is present in the whey-bound fresh cheese. The amylomaltase-treated starch can be added at any point in the production process, but preferably, it is added prior to homogenization.

It is an advantage of whey-bond fresh cheeses comprising both a granular starch and an amylomaltase-treated starch, that the stability, in particular the heat- or bake stability, of the whey-bound fresh cheese is significantly further increased. This can be seen by similar experiments as described above for the addition of granular starch. It has clearly been shown that the effect on cheesecake texture of addition of both a granular starch and an amylomaltase-treated starch is higher than the combined effect of an equal quantity of each starch separately. Thus, the effect on cheesecake texture of addition of both the granular starch and the amylomaltase-treated starch is synergistic, which is unexpected.

A similar firmness-increasing effect can be observed for the addition of granular starch to regular, non-whey-bound fresh cheese, using the same conditions as for whey-bound fresh cheese. Also, a firmness-increasing effect of adding a combination of granular starch and amylomaltase-treated starch to a regular fresh-cheese can be observed, in line with the effects observed for whey-bound fresh cheese, although the effect in regular fresh cheese was not as large as in whey-bound fresh cheese.

For example, a cheesecake made with a filling comprising whey-bound cream cheese as well as 4 wt. % granular starch and 4 wt. % amylomaltase-treated starch displayed no syneresis, was solid, had good mouthfeel and texture.

Where both a granular starch and an amylomaltase-treated starch are present in the whey-bound fresh cheese, the weight ratio between the granular starch and the amylomaltase-treated starch is preferably between 1:5 and 5:1, preferably between 1:4 and 4:1, more preferably between 1:3 and 3:1, and most preferably between 1:2 and 2:1.

In particularly preferred embodiments, the whey-bound fresh cheese of the invention further comprises an emulsifier. An emulsifier can be any known emulsifier suitable for food applications, such as for instance lecithine, polysorbate or a polypeptide emulsifier. A polypeptide emulsifier is preferred. A polypeptide emulsifier can be preferably a plant-derived polypeptide emulsifier, such as for instance a root- or tuber-derived polypeptide, in particular a potato polypeptides. Of potato polypeptides, the patatin fraction and the protease inhibitor fraction are particularly suitable, in particular the protease inhibitor fraction.

An alternative preferred emulsifier can be preferably an egg-derived emulsifier, such as lecithine. An egg-derived emulsifier can be present in the whey-bound fresh cheese of the invention by addition of for example egg, egg white or egg yolk. Egg, egg white and/or egg yolk may alternatively be included in dried, powder form, so as to avoid the addition of extra water as present in egg.

In embodiments where an emulsifier is used, it is preferred to use a lower proportion of granular starch and/or amylomaltase-treated starch in the whey-bound fresh cheese than described above, such as 1-6 wt. %, preferably 1.5-4.5 wt. %, of granular starch, and/or 1-6 wt. %, preferably 1.5-4.5 wt. %, of amylomaltase-treated starch.

A polypeptide emulsifier should generally be native. A polypeptide emulsifier may be obtained by known methods, and can be commercially obtained. Preferably, the polypeptide emulsifier has a purity of at least 80 wt. %, more preferably at least 85 wt. %, even more preferably at least 90 wt. %, most preferably at least 95 wt. %, based on dry matter. The purity of a polypeptide emulsifier can be determined by the Kjeldahl method as described above, using a conversion factor of 6.25 instead of 6.36, which can be achieved also by using the Sprint™ rapid protein analyzer.

In embodiments where an emulsifier is present, the emulsifier may be present in any suitable amount, such as 0.1-10 wt. %, preferably 0.5-8 wt. %, more preferably 1-5 wt. %, based on the weight of the whey-bound fresh cheese. If the emulsifier is a polypeptide emulsifier, it is preferred if the polypeptide emulsifier is present in a quantity of about 0.2-5 wt. % of the polypeptide emulsifier, expressed as the weight % of polypeptide per quantity of whey-bound fresh cheese. More preferred is a quantity of 0.5-4 wt. %, most preferably 1.5-3 wt. %.

Furthermore, the whey-bound fresh cheese of the invention may comprise conventional additives, such as colorants, odorants, stabilizers, preservatives and the like. Suitable stabilizers include inulin, pectin, gelatin, and various types of gums, such a locust bean gum or xanthan gum.

The invention equally pertains to a food product, comprising a whey-bound fresh cheese as described above. Preferably, the food product is a food product which is to be heated prior to consumption, even if the food product is to be consumed in cool state, such as for example a bakery product. Heating in this context refers to a temperature of at least 80° C., preferably at least 100° C., more preferably at least 130° C., for a period of at least 15 min, preferably at least 30 min, more preferably at least 45 min, even more preferably at least 60 min.

Suitable examples of food products according to the invention are cheesecake or cheesecake filling, wherein the cheesecake filling comprises a whey-bound fresh cheese according to the invention, a whey-bound fresh cheese filled fish or vegetable, wherein the whey-bound fresh cheese is as described above, a pastry roll comprising a whey-bound fresh cheese according to the invention, or a quark pie or quark pie filling based on fresh cheese according to the invention.

Most preferably, a food product of the invention is a cheesecake filling, or a cheesecake comprising said filling, wherein the cheesecake filling comprises a whey-bound fresh cheese, preferably a cream cheese, according to the invention.

The invention furthermore pertains to use of granular starch and an amylomaltase-treated starch and other components as described above to improve the stability of a whey-bound fresh cheese. Stability, in this context, is one or more of freeze/thaw stability, heat stability or bake stability, preferably heat- or bake stability.

The invention furthermore pertains to a method for preparing a bakery product comprising providing a mixture of a whey-bound fresh cheese comprising as a first starch a granular starch and as a second starch an amylomaltase-treated starch and further conventional ingredients to prepare a filling, applying the filling onto or into a pastry or a pastry dough, and baking the filled pastry or filled pastry dough to obtain the bakery product. Preferably, the filling is a cheesecake filling, and the bakery product is a cheesecake.

The invention further relates to the use of a whey-bound fresh cheese comprising a granular starch and an amylomaltase-treated starch as defined above in the preparation of a bakery product, for example a cheesecake. In case a whey-bound fresh cheese is used which does not already include a granular starch or an amylomaltase-treated starch, it is also within the scope of the invention to combine the fresh cheese and the granular starch and/or the amylomaltase-treated starch during the preparation of the bakery product. In some embodiments, it is preferred to add the granular starch and/or the amylomaltase-treated starch to the filling batter, in order to maximize the stability increase; in other embodiments it is preferred to add the granular starch and/or the amylomaltase-treated starch to the fresh cheese during or after fresh cheese production, in order to obtain a fresh cheese with increased stability which is comparable to regular, non-whey-bound cream cheese based cheesecakes.

A filling, in this respect, is any separably identifiable component or part of the bakery product, usually included to convey a particular taste or structure element to the product. Thus a filling may be present inside the bakery product, for example in cases where the inside consists of filling, or in the case of separably identifiable chunks of filling distributed throughout the bakery product. However, the filling may alternatively or additionally be present on a side of the bakery product, such as for example on top or on a side of the bakery product.

The filling may further comprise other conventional ingredients such as salt, sugar, thickening agents, binding agents, egg whites and/or egg yolks, flour, fruit or fruit juice, flavorants, and other components known in the art of fillings.

The filling may be prepared separately, which preparation preferably comprises baking, and then applied onto or into a pre-prepared pastry to obtain the bakery product. Alternatively, the filling may be applied onto or into a pastry dough from which the bakery product is to be prepared. The filling and pastry dough are then preferably baked in an oven under conventional conditions to obtain the bakery product.

For the purpose of clarity and a concise description features are described herein as part of the same or separate embodiments, however, it will be appreciated that the scope of the invention may include embodiments having combinations of all or some of the features described.

The invention will now be further illustrated by the following, non-restrictive examples.

Example 1: Effects of Addition of Granular Starch and Amylomaltase-Treated Starch to Whey-Bound Cream Cheese Whey-Bound Cream Cheese Preparation The whey-bound cream cheese was prepared by mixing the ingredients in a Vorwerk Thermomix. Cream and crème fraiche were mixed to a 31% fat content, and 0.6% salt was added. Amylomaltase-treated starch (ETENIA 457, Avebe, The Netherlands) was mixed in at 4 wt. % where applicable just before homogenization in the Thermomix. This mixture was acidified to pH 4.7 with lactic acid. Afterwards the cream cheese was heated to 55° C. and homogenized at 50 bar (Niro Soavi Twin Panda Homogenizer). Subsequently the cream cheese was heated to 82° C., and a granular starch (ELIANE SE 460, an adipic acid-crosslinked, acetylated waxy potato starch, available from Avebe, The Netherlands) was added to the cream cheese (4 wt. %) where applicable, and mixed well. The cream cheese was kept at 82° C. for one minute to pasteurize, and was then filled in plastic containers and cooled down to 4° C. by a blast chiller and stored overnight in the refrigerator at 4° C.

The reference cream cheese is a cream cheese without added starch.

Cream cheese 1: only amylomaltase-treated starch (4 wt. % ETENIA 457)

Cream cheese 2: only granular starch (4 wt. % ELIANE SE460)

Cream cheese 3: 4 wt. % granular starch and 4 wt. % added amylomaltase-treated starch.

Texture Analysis

Texture analyses of the cream cheese were performed using a texture analyzer (Stable Micro Systems, UK) with the following settings:

Probe—0.5 inch Ø (ebonite)

Test speed—1.5 mm/s (pre-test 1.5 mm/s, post-test 10 mm/s)

Penetration—10 mm

Trigger—auto, 0.10 N

The texture of the cream cheese was determined by inserting the probe into a cream cheese sample.

Results

The results are displayed in FIG. 1. Addition of only granular starch increased the firmness of the cream cheese, as determined by the texture analysis, to above that of the reference. Addition of only amylomaltase-treated starch also increased the firmness of the cream cheese to above that of the reference. Addition of both the granular starch and the amylomaltase-treated starch resulted in an increase in firmness well above that of all other cream cheeses. This indicates that the two starch types influence cream cheese firmness synergistically.

Example 2: Effects of Addition of Granular Starch and Amylomaltase-Treated Starch to Cheesecake

Cream Cheese Preparation

Whey-bound cream cheese was prepared by mixing the ingredients in a Vorwerk Thermomix. Cream and milk were mixed to a 31% fat content. Amylomaltase-treated starch ("AM-starch", ETENIA 457, Avebe, The Netherlands) was mixed in at the indicated quantity where applicable just before homogenization (homogenization at 50° C. and 50 bar) in the Thermomix. The mixture was pasteurized for one minute at 72° C. before being transferred to a Schott glass bottle of 2 liter and cooled down to 21° C. by running tap water. The bottle was transferred to a laminar flow cabinet and inoculated with CSK Z944.6 (CSK Food Enrichment CV, The Netherlands) at 1 unit per 10 liter fresh cheese. The bottle was placed in a water bath at 26° C. for overnight fermentation. The next day the pH was measured using a pH electrode, which should be below at 4.7 or lower if fermentation is to be deemed successful. To the final fresh cheese, 0.6 wt. % salt was added.

The resulting cream cheese was heated to 82° C. and where applicable, a granular starch (ELIANE SE 460, an adipic acid-crosslinked, acetylated waxy potato starch, available from Avebe, The Netherlands) and/or polydextrose (Sta-Lite R90, Tate & Lyle, The Netherlands) was added at the indicated quantity to the cream cheese. The cream cheese was kept at 82° C. for one minute to pasteurize. Then it was transferred to a plastic container and cooled down to 4° C. by a blast chiller and stored overnight in the refrigerator at 4° C.

A reference Mon Chou cream cheese (Campina, The Netherlands), obtained from a local supermarket, was used as a reference regular cheesecake. The Mon Chou cheese contained 31 wt. % fat and 6.8% protein.

Cheesecake Preparation

The cheesecakes were prepared using the following procedure:

Preparation of Cake Bottom:

An 18 cm diameter cake mall was covered with molten butter fat and baking paper. Biscuits were milled by a Pepping mill and afterwards mixed by hand with molten butter and sugar to produce the dough. The dough was pushed at the bottom of the cake mall with a flat plastic device.

Preparation of Cake Filling Batter:

The cream cheese was mixed with the sugar and vanilla sugar by a Hobart mixer (at speed 2 out of 3). Pasteurized liquid egg (De Roode Hen, The Netherlands) was mixed into the cake filling batter by a Hobart mixer (at speed 1 out of 3). The cake filling batter was poured on top of the dough in the cake mall. The cheesecake was baked at 163° C. (325° F.) for 65 minutes in a Probat Domino Plus oven. A Kraft classic cheesecake recipe was used, which is shown in Table 1.

As indicated, whey-bound cream cheese without added starch could be used, as long as the same quantity of granular and optionally amylomaltase-treated starch as required for the whey-bound cream cheese were added to the cheesecake filling batter, at the same quantity relative to the quantity of cheese.

TABLE 1

| Kraft classic cheesecake recipe for 8 inch cake mold | |
| --- | --- |
| Dough (for crust) | Filling of the cheesecake |
| 154 g biscuits | 717 g cream cheese |
| 30 g sugar | 158 g sugar |
| 63 g butter | 4 g vanilla sugar |
|  | 158 g egg |

Texture Analysis

Texture analyzes of the cheesecakes were performed using a texture analyzer (Stable Micro Systems, UK) with the following settings:

Probe—0.5 inch Ø (ebonite)

Test speed—1.5 mm/s (pre-test 1.5 mm/s, post-test 10 mm/s)

Penetration—10 mm

Trigger—auto, 0.10 N

Figure 2:
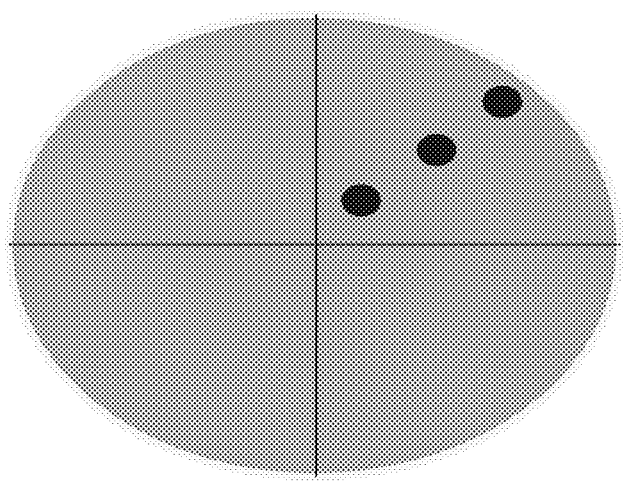
FIG. 2: positions at which the texture analysis was performed on the cheesecake.

The texture analyses in the cheesecake were done after resting the cake for 2 hrs at room temperature and 22 hr at 4° C. at the positions indicated in FIG. 2. One quarter of the cake was cut out, so as to obtain a quarter cake having two cuts of half a cake diameter at a 90° angle, and a full quarter of the cake circumference (the crust). On the line connecting the 90° angle and the point halfway the quarter cake circumference, three measurements were performed, one in the middle ("middle"), one at 2.5 cm from the 90° angle ("center"), and one at 2.5 cm from the crust ("outside"). Texture was expressed as the maximum peak force, and reported in [g].

Sensory Evaluation

Sensory evaluation was performed by 3-8 trained panelists. First the cheesecakes were photographed. Photographs from the top of a cheesecake and photographs from the sides of the cheesecake pieces were taken. Afterwards, the quality of the cheesecakes was scored by the panelists for visual observations and taste attributes. The aspects described in Table 2 were scored on a 1-10 scale; the description for every score is given in the table.

TABLE 2

| Sensory attributes for the cheesecakes | |
| --- | --- |
| Visual observation | |
| Syneresis (at bottom) | |
| None | 10 |
| A small amount of fluid next to cake | 7 |
| Moderate syneresis | 5 |
| Syneresis observed | 4 |
| A lot of bleeding | 3 |
| Severe bleeding | 0 |
| Syneresis (on top) | |
| No water on top of the cake | 10 |
| A small amount of water on top | 7 |
| Water on top of the cake | 5 |
| A lot of water on top of the cake | 3 |
| A very large amount of water on top of the cake | 0 |
| Sides of the cake | |
| Straight sides of the cake | 10 |
| Partly straight and partly bended sides | 5 |
| Sides of the cake bended inside | 0 |
| Cake filling after cutting the cake | |
| Crumbly | 10 |
| Firm or moderate crumbly | 6 |

TABLE 2-continued

Sensory attributes for the cheesecakes

| | |
|---|---|
| Pudding texture | 3 |
| Sauce texture | 0 |
| Taste | |
| Bottom of cake | |
| Crunchy bottom | 10 |
| Inhomogeneous | 6 |
| Wet | 3 |
| Very wet or soaked | 0 |
| Mouth feel cake filling | |
| Crumbly filling | 10 |
| Firm filling | 6 |
| Pudding texture | 3 |
| Sauce texture | 0 |

Results

Cheesecakes 1-12 were prepared, using a filling comprising various whey-bound cream cheeses. Starch was either added to the batter of the cheesecake filling, or to the cream cheese during preparation. Versions with leveled dry-matter content using polydextrose were also prepared, for comparison (polydextrose has been added to the cream cheese during together with the granular starch, see cheesecakes 8-10). In addition, a cheesecake with a reduced quantity of granular starch (11) was prepared. A reference cheesecake based on a regular Mon Chou filling (12) was also prepared by the same recipe.

TABLE 3

Cream cheeses used in cheesecakes:

| | |
|---|---|
| 1 | whey-bound, reference |
| 2 | whey-bound, with 4 wt. % AM-starch |
| 3 | whey-bound, with 4 wt. % granular starch |
| 4 | whey-bound, with 4 wt. % AM-starch and 4 wt. % granular starch |
| 5 | whey-bound reference, with 4 wt. % AM-starch, based on the weight of the cream cheese, added to the filling batter |
| 6 | whey-bound reference, with 4 wt. % granular starch, based on the weight of the cream cheese, added to the filling batter |
| 7 | whey-bound reference, with 4 wt. % AM-starch and 4 wt. % granular starch, based on the weight of the cream cheese, added to the filling batter |
| 8 | whey-bound reference with 8 wt. % added polydextrose |
| 9 | whey-bound with 4 wt. % AM-starch and 4 wt. % polydextrose |
| 10 | whey-bound with 4 wt. % granular-starch and 4 wt. % polydextrose |
| 11[a] | whey-bound, 4 wt. % AM-starch and 2 wt. % granular starch |
| 12 | Mon Chou reference |

[a] this cake was baked at 177° C. for 75 min. The cream cheese was prepared as described in example 4 using Eliane CE 390.

Figure 3:
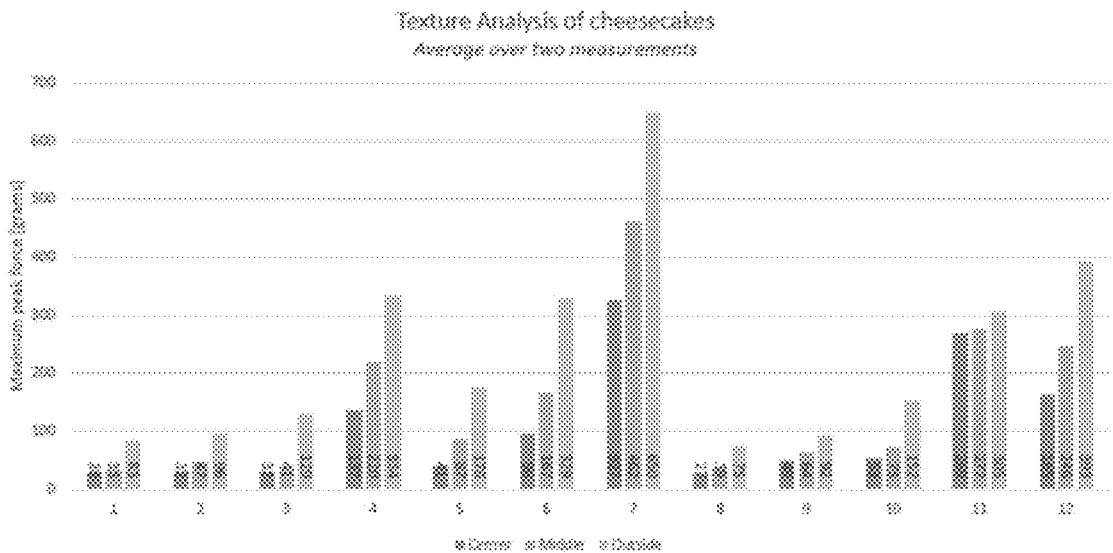
FIG. 3: Maximum peak force of cheesecakes described in example 2.

The results are displayed in tables 4 and 5, as well as in FIG. 3.

TABLE 4

Results of texture analysis and moisture retaining:

| | Texture analysis [g] | | |
|---|---|---|---|
| | Center | Middle | Outside |
| 1 | 28 | 33 | 83 |
| 2 | 32 | 47 | 96 |
| 3 | 32 | 41 | 129 |
| 4 | 137 | 220 | 334 |
| 5 | 41 | 87 | 176 |
| 6 | 96 | 167 | 329 |
| 7 | 327 | 462 | 650 |
| 8 | 27 | 39 | 75 |
| 9 | 49 | 64 | 92 |
| 10 | 53 | 73 | 152 |
| 11 | 269 | 277 | 305 |
| 12 | 165 | 246 | 393 |

It is clear from table 4 that addition of granular starch alone in the cream cheese results in an increased firmness of the cheesecake filling, indicative of higher heat- and bake stability. The same can be said for the addition of AM-starch. In combination however, the two starch types have the effect of increasing the firmness to a firmness comparable to that of a regular cream cheese (cheesecakes 2-4). The effect of the combination of starches is much higher than the sum of the separate effects, indicating synergism.

Adding the starches to the cream cheese filling batter, instead of to the cream cheese during preparation, also results in a strong increase of the heat- and bake stability of the cream cheese filling. In this case, however, the firmness surpasses the firmness of the reference Mon Chou cream cheese-based cheesecake (cheesecakes 5-7).

By addition of polydextrose, it has been verified that the observed effects are due to the specific combination of starches, and not to the higher dry matter content (cheesecakes 8-10).

TABLE 5

Results of visual inspection and tasting

| | Visual inspection | | | | Taste | |
|---|---|---|---|---|---|---|
| Cheesecake | Syneresis at bottom | Syneresis on top | Side | Filling | Bottom | Filling |
| 1 | 5 | 7 | 6 | 1 | 8 | 0 |
| 2 | 10 | 7 | 8 | 3 | 10 | 1 |
| 3 | 10 | 7 | 7 | 2 | 9 | 4 |
| 4 | 10 | 7 | 8 | 9 | 9 | 5 |
| 5 | 10 | 7 | 8 | 2 | 10 | 3 |
| 6 | 10 | 7 | 6 | 8 | 9 | 4 |
| 7 | 10 | 7 | 9 | 9 | 9 | 10 |
| 8 | 3 | 7 | 7 | 4 | 1 | 2 |
| 9 | 10 | 7 | 7 | 6 | 8 | 3 |
| 10 | 10 | 7 | 7 | 6 | 10 | 3 |
| 11 | 10 | 7 | 7 | 6 | 10 | 3 |
| 12 | 10 | 8 | 6 | 6 | 10 | 7 |

The results in table 5 show that addition of a granular starch increases the appearance and taste of a cheesecake comprising a whey-bound cream cheese based filling after baking. In combination with an amylomaltase-treated starch however, the cheesecake quality further improves, to a quality comparable to cheesecakes based on regular, Mon Chou-type cream cheese.

Example 3: Variation in Starch Source

A whey-bound cream cheese reference is made using 6 wt. % amylomaltase-treated starch ("ETENIA 457") following the protocol described in example 2 with some minor modifications as described below. In one example, a cream cheese was prepared to which no granular starch had been added (cream cheese a).

A cream cheese comprising granular starch was made following the same protocol. In this case, 4 wt. % amylomaltase-treated starch was used in combination with 4 wt. % crosslinked hydroxypropylated tapioca starch (Farinex VA 70T, Avebe, The Netherlands), added at the final stage of cream cheese production to enhance the bake stability (cream cheese b).

In both cream cheeses, the cream cheese was heated to 72° C. and homogenized by an NIRO Soavi Type NS2002H homogenizer. The cream cheeses were homogenized at a pressure of 160 bar. After homogenization the cream cheese was poured in plastic containers of 200 ml and stored in the refrigerator at 4° C. until analysis.

TABLE 6

Effect of addition of granular tapioca starch to a whey-bound cream cheese comprising amylomaltase-treated starch.

| Cream cheese | Starch additives | Process homogenisation pressure | Hard (10) to soft (0) | Syneresis none (10) to much (0) |
|---|---|---|---|---|
| a | 6% ETENIA 457 (reference) | 160 | 8 | 7 |
| b | 4% ETENIA 457 and 4% granular crosslinked, hydroxypropylated tapioca starch | 160 | 7 | 10 |

It follows from table 6 that addition of granular starch to whey-bound fresh cheese results in a higher ability to withstand syneresis of the fresh cheese in a whey-bound cream cheese.

Three additional cheesecakes were prepared based on cream cheeses prepared following the above protocol in this example, but using other starch types.

The cream cheeses used in cheesecakes 13 and 14 were prepared as before in this example (cream cheese a and b). The cream cheeses of cheesecakes 15-17 are whey-bound cream cheeses comprising 4 wt. % amylomaltase-treated starch (ETENIA 457, Avebe, The Netherlands), as well as granular starch which was added after fermentation and prior to the 2nd homogenization step and pasteurization of the cream cheese production.

The cream cheese used in cheesecake 15 comprised 4 wt. % native granular amylopectin potato starch (Eliane 100, Avebe, The Netherlands) and was homogenized at 160 bar, whereas the cream cheeses used in cheesecakes 16 and 17 comprised native granular tapioca (SMS, Thailand) and corn (Ingredion, USA) starch, respectively, which were homogenized pressure-less. In addition, a cheesecake 18 was prepared comprising the reference cream cheese described earlier in this example (cream cheese a), but in which granular starch (Eliane 100, Avebe, The Netherlands) was added during the preparation of the cheesecake filling batter, after preparation of the cream cheese. See table 7.

TABLE 7

Cheesecake fillings based on various whey-bound cream cheeses.

| Cheesecake | Cream cheese and additive |
|---|---|
| 13 | reference cream cheese of example 1 |
| 14 | 4% granular crosslinked, hydroxypropylated tapioca starch of example 1 |
| 15 | cream cheese with 4% native granular amylopectin potato starch |
| 16 | cream cheese with 4% native granular tapioca starch |
| 17 | cream cheese with 4% native granular corn starch |
| 18 | a (reference) + 4% native granular amylopectin potato starch added after cream cheese preparation |

The cheesecake recipe is shown in Table 8:

TABLE 8

| Dough for cake bottom | | | Cake filling | | |
|---|---|---|---|---|---|
| wt. % | Grams | | wt. % | Grams | |
| 51 | 84 | Biscuits | 20 | 145 | Cream cheese |
| 20 | 33 | Sugar | 21 | 151 | Sugar |
| 30 | 49 | Butter | 1 | 5 | Vanilla sugar |
| 100 | 166 | Total | 11 | 83 | Sour cream 10% fat |
| | | | 29 | 207 | Sour cream 24% fat |
| | | | 19 | 134 | Egg |
| | | | 100 | 725 | Total |

The cheesecakes were prepared using the following procedure:

An 18 cm diameter cake mall was covered with molten butter fat and baking paper.

Biscuits were milled by a Hobart mechanic mixer and afterwards mixed by hand with melted butter and sugar to produce the dough (Table 7).

The dough was pushed at the bottom of the cake mall with a flat plastic device.

To prepare the cake filling:
1. The cream cheese was mixed with the sugar and vanilla sugar by an electric hand mixer.
2. The sour cream was mixed into the cake filling by an electric hand mixer.
3. The egg was mixed into the cake filling by an electric hand mixer.

The cake filling was poured on top of the dough in the cake mall.

The cheesecake was baked at 190° C. for 50 minutes.

The quality of the cakes was scored for visual observations and taste attributes as described above. The results of cheesecakes with and without a filling comprising granular starch are shown in table 9.

TABLE 9

Visual appearance and taste of various cheesecakes.

| Cheesecake | Bleeding on baking tray from none (10) to much (0) | Shape stability of cake edge from good (10) to bad (0) | Crispy (10) or very wet (0) bottom | Moisture on top of cake from none (10) to much (0) | Filling 'crumbly' (10) to custard (0) |
|---|---|---|---|---|---|
| 13 | 4 | 0 | 4 | 5 | 1 |
| 14 | 7 | 6 | 10 | 5 | 8 |

TABLE 9-continued

Visual appearance and taste of various cheesecakes.

| Cheese-cake | Bleeding on baking tray from none (10) to much (0) | Shape stability of cake edge from good (10) to bad (0) | Crispy (10) or very wet (0) bottom | Moisture on top of cake from none (10) to much (0) | Filling 'crumbly' (10) to custard (0) |
|---|---|---|---|---|---|
| 15 | 6 | 10 | 8 | 5 | 6 |
| 16 | 6 | 8 | 4 | 5 | 7 |
| 17 | 9 | 5 | 4 | 7 | 3 |
| 18 | 8 | 10 | 8 | 5 | 9 |

It is apparent from table 9 that a cheesecake filling comprising whey-bound fresh cheese, in this case cream cheese, as well as a granular starch has a beneficial influence on the syneresis, heat stability and bake stability of the cheesecake, regardless of whether the granular starch has been added during the production of the cream cheese, or afterwards. This works for starch of various botanical sources.

Example 4: Variation in Starch Ratio and Addition of an Emulsifier

Cream Cheese Preparation

The lab scale cream cheese preparation was the same as example 2. But to certain cream cheeses an emulsifying peptide (Solanic 300, a native potato protein available from Avebe, The Netherlands) was added at the start of the cream cheese production process together with the amylomaltase-treated starch.

After fermentation a granular starch (Eliane CE390, a POCl$_3$-crosslinked, acetylated waxy potato starch, Avebe, The Netherlands) was added and the cream cheese was heated to 82° C. in the Thermomix and kept at 82° C. for 1 minute. Then cream cheese was homogenized at 50/150 bar and filled in plastic containers. These were cooled down to 4° C. by a blast chiller and stored overnight in the refrigerator at 4° C.

Cheesecake Preparation

Using the same preparation procedure as described in example 2 cheesecakes were prepared with varying ratios of granular starch and crosslinked starch, as well as cheesecakes additionally comprising an emulsifying peptide (Solanic 300, a native potato protein available from Avebe, The Netherlands). In this example though, the cheesecakes were baked at 355° F./177° C. for 65 min.

Results

Figure 4:
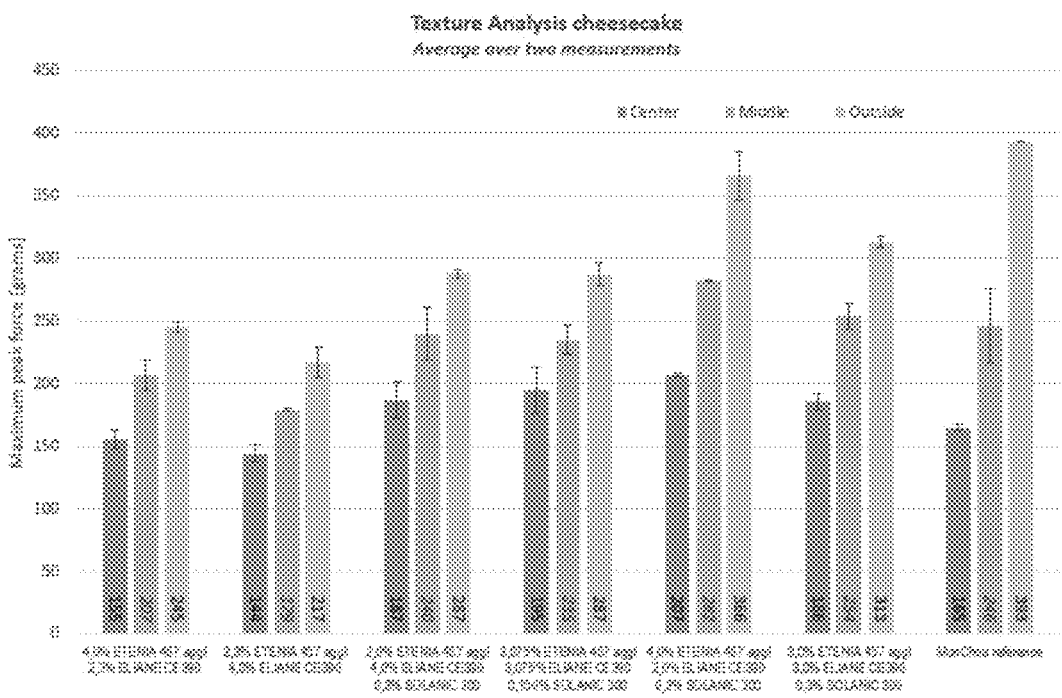
FIG. 4: Maximum peak force of cheesecakes described in example 4.
Figure 5A:
FIG. 5: Cheesecake with a filling based on whey-bound cream cheese, comprising 4 wt. % granular starch and 4 wt. % amylomaltase-treated starch. (a) top-view (b) side view.
Figure 5B:
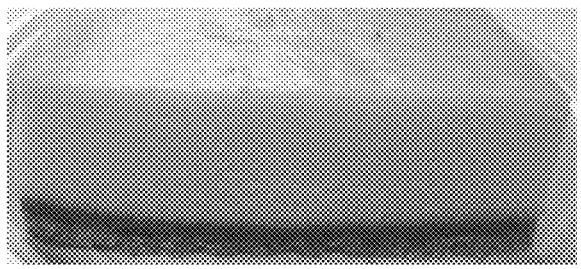
Figure 6:
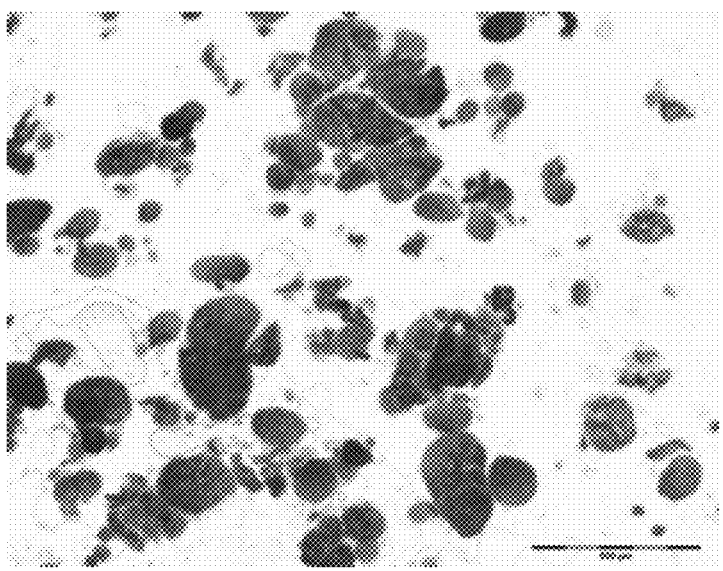
FIG. 6: Light microscopy image of a cross-section of a cheesecake comprising granular starch (4 wt. % Eliane SE 460), stained with iodine to show the starch granules.

The results of the texture analysis, performed as described in example 2, are shown in FIG. 4. The results indicate that granular starch and amylomaltase-treated starch may be used at varying ratio's to attain the beneficial effect on cheesecake firmness. In addition, the results show that addition of an emulsifying peptide has an additional increasing effect on cake firmness. The Mon Chou reference cheesecake in FIG. 4 is the same cake as the cake 12 in FIG. 3.

The invention claimed is:

1. A cheesecake filling comprising a whey-bound fresh cheese having 1-6 wt. % milk protein based on the weight of the cheese, comprising as a first starch type a granular starch and as a second starch an amylomaltase [EC 2.4.1.25] treated starch, wherein the quantity of granular starch is 1.5 to 6 wt. % and wherein the quantity of amylomaltase-treated starch, which amylomaltase-treated starch has been treated with 0.5-5 ATU/g amylomaltase, is 1-6 wt. %, based on the weight of the cheese, and the weight ratio between the granular starch and the amylomaltase-treated starch is between 1:3 and 3:1, and wherein the cheesecake filling contains at least 10 wt. % of whey-bound fresh cheese, and the cheesecake filling is baked prior to consumption, to a temperature of at least 130° C., for a period of at least 30 minutes.

2. The cheesecake filling according to claim 1, wherein the granular starch is a crosslinked starch.

3. The cheesecake filling according to claim 1, wherein the granular starch is an adipic acid, phosphorus oxychloride, metaphosphate, citric acid, dimethylol ethylene urea or cyanuric chloride crosslinked starch.

4. The cheesecake filling according to claim 1, wherein the granular starch is a stabilized starch.

5. The cheesecake filling according to claim 1, wherein the whey-bound fresh cheese further comprises an emulsifier.

6. The cheesecake filling according to claim 1, wherein the granular starch is a waxy starch comprising at least 90 wt. % amylopectin, based on the weight of the starch.

7. The cheesecake filling according to claim 1, wherein the granular starch is a potato starch, maize starch, rice starch, tapioca starch, pea starch, sweet potato starch, sago starch or wheat starch.

8. A method for preparing the cheesecake filling according to claim 1, comprising the steps of:
  mixing a fat source and a whey source into a dairy mixture having a desired initial fat concentration,
  homogenizing the dairy mixture,
  adding a lactic acid bacterial inoculum and/or a suitable acid,
  incubating to allow coagulation to occur to form a whey-bound fresh cheese,
  ripening of the whey-bound fresh cheese,
  mixing in a granular starch, and
  mixing in an amylomaltase-treated starch.

* * * * *